Jan. 23, 1962 H. H. LEVY ETAL 3,018,393

REGENERATIVE BROADENING CIRCUIT

Filed Oct. 30, 1959

INVENTOR
HAROLD H. LEVY
JOSEPH L. TINSLEY

BY [signature]

ATTORNEY 3,018,393

REGENERATIVE BROADENING CIRCUIT

Harold H. Levy, 7501 Chesapeake St., East Columbia Park, Landover, Md., and Joseph L. Tinsley, 6227 Allentown Road, Camp Springs, Md.

Filed Oct. 30, 1959, Ser. No. 850,003
4 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to regenerative broadening circuits. More particularly, the invention relates to a novel regenerative broadening circuit which is especially useful in computer and related pulsed signal circuits.

The invention is concerned principally with computers of the type where information is represented by the presence or absence of a pulse in each of a number of separate preselected time intervals. Such computers generally contain a master clock which establishes the preselected time intervals by simultaneously enabling or disabling certain circuits in various parts of the computer. Connection of the master clock to individual of these certain circuits unduly complicates the circuitry and requires the use of circuit elements which are redundant. Further, as the information pulses pass between these circuits, they are subjected to unavoidable delay and attenuation. As a result, the shape and amplitude of the pulses are altered until these pulses are no longer capable of controlling the circuits to which they are applied. In many systems, special means for requantizing have to be incorporated requiring untold superfluous circuitry. Also, flip-flop type oscillators are generally included in such computers even though the difficulty of trouble shooting a defective flip-flop circuit is well known. Furthermore, the random application of information pulses is unduly limited in such computers.

It is, therefore, necessary to provide a means for correcting the shape and amplitude of the pulses in various signal paths of the computer and to combine and simplify such paths, to remove redundant elements, to replace flip-flop circuitry, and to provide random operation. Such a means must be capable of amplifying, widening, narrowing, or otherwise reshaping the pulse, in addition to synchronizing the time position of the pulse with the control signals from the master clock, when required. Since these circuits are frequently used in mobile units, it is desirable that the circuit be rugged, compact, reliable, lightweight, and efficient as regards power consumption.

The circuit of this invention is an improvement over the copending application Serial Number 780,644, filed December 15, 1958, entitled "Gated Amplifier," Frederick C. Hallberg, applicant.

An object of the present invention is, therefore, to provide circuitry having the desirable properties set forth above which is simple and inexpensive.

A further object of the invention is to provide a plurality of transistorized computer pulse forming circuits which are triggered by information pulses, whether randomly applied or programmed, in which the shape and time position of the output pulses are controlled by clock pulses.

Other objects and many of the attendant advantages of this invention will be readily appreciated as the same becomes better understood by reference to the following detailed description when considered in connection with the accompanying drawings wherein.

Briefly, this invention is concerned with regenerative broadening circuitry made up of a plurality of gated amplifiers which are selectively triggered by a like plurality of input sources in coincidence with clock pulses which are provided through a single gate. The regenerative broadening circuit of this invention is a dynamic circuit in which no power is consumed when the circuit is not in use. By the use of basic computer logic concepts, triggering can take place only during clock time. Since the front edge of the trigger pulse determines the beginning of the operation of the circuit, except when such front edge precedes the front edge of the clock pulse, and the back edge of the clock pulse determines the ending of the operation of the circuit, timing is quantized. Also, since this type of circuit saturates, amplitudes are also quantized.

Figure 1:
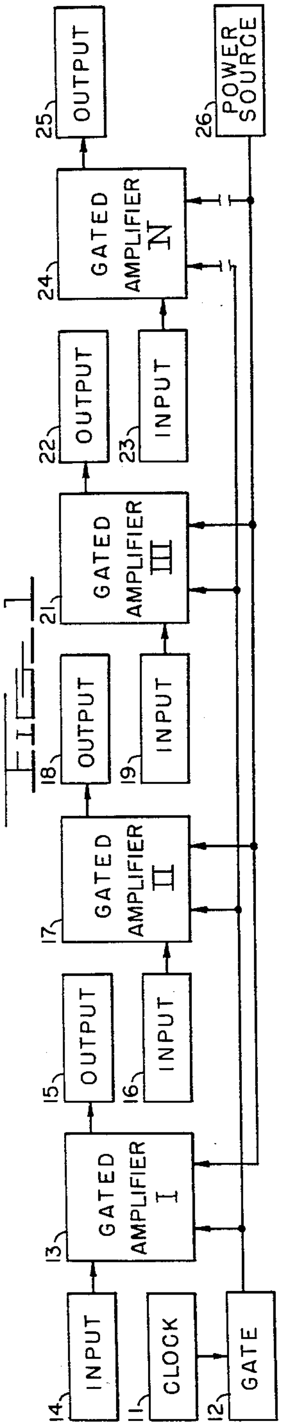
FIG. 1 shows the circuit of this invention in block diagram.

Referring now to the drawings, in which like numerals indicate like elements in the figures, FIG. 1 shows the clock 11 connected to the gate 12. The output of gate 12 is applied to the plurality of gated amplifiers 13, 17, 21 and 24. Also applied to gated amplifier 13 is the information pulse input 14, to gated amplifier 17 is input 16, to gated amplifier 21 is input 12 and to gated amplifier 24 is input 23. The output of gated amplifier 13 is output 15, of gated amplifier 17 is output 18, of gated amplifier 21 is output 22 and of gated amplifier 24 is output 25. Also connected to each of the gated amplifiers 13, 17, 21 and 24 is a power source 26.

Figures 2, 3:
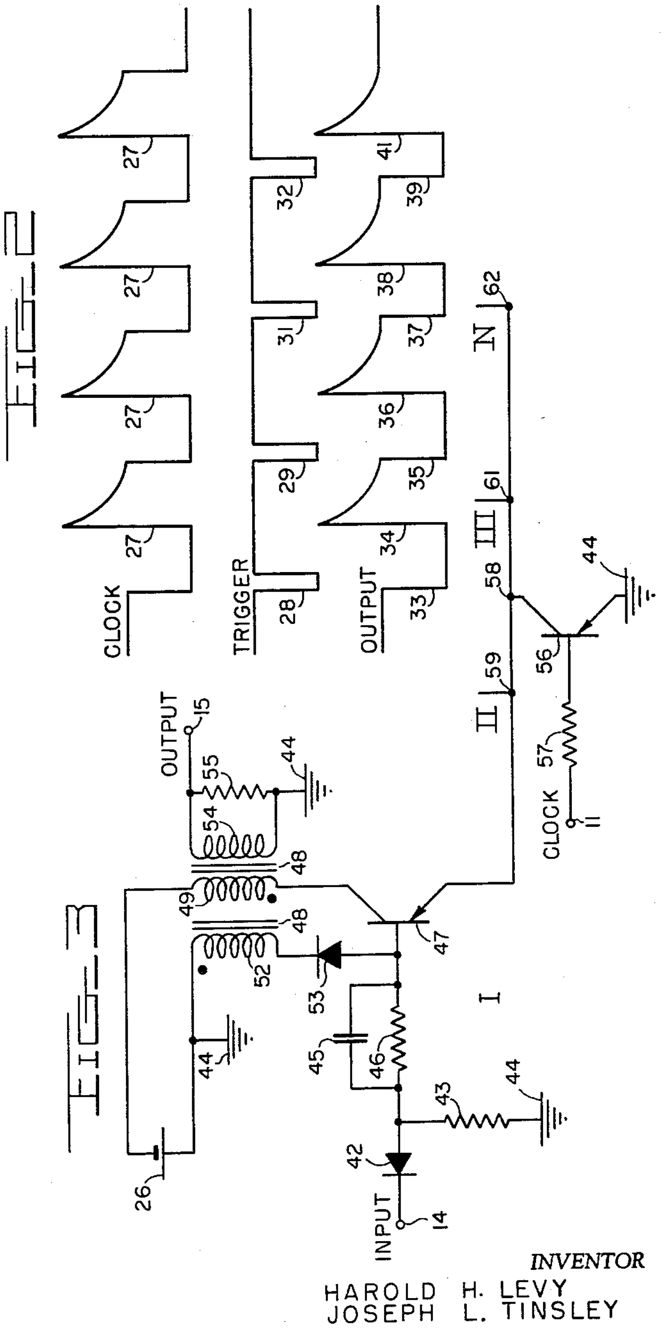
FIG. 2 shows the wave forms of the operation of one of the stages of the circuit of this invention.
FIG. 3 shows a schematic diagram of one of the stages of the circuit of this invention.

FIG. 3 shows the details of a typical stage of the regenerative broadening circuitry of this invention as well as the single gate for the plurality of stages. The clock 11 is connected to a current limiting resistor 57 which is connected at its other end to the base of pnp transistor 56. The emitter of transistor 56 is connected to the common return 44. The collector of transistor 56 is connected to a junction 58 to which are connected the plurality of gated amplifiers, only one of which is shown in detail, since the several stages are identical in structure, with the others shown symbolically as being connected to junction 58 at junctions 59, 61 and 62. The input 14 to the first gated amplifier stage is connected to a unidirectional element 42 which is polarized so as to provide a suitable input polarity to actuate a transistor 47, in this case a pnp type. The unidirectional element 42 is connected, at its other side, in shunt with a resistance 43 to a common return 44. Resistance 43 is provided to assure that the potential tolerated by the base of transistor 47 will not be reached. Also, connected to such other side of the element 42 is a filter circuit made up of a capacitor 45 and a resistor 46 connected in parallel. The filter circuit, to remove spurious signals, is connected to the base of the transistor 47. The collector of transistor 47 is connected to one end of a winding 49 on a magnetic core 48. Connected to the opposite end of winding 49 is the negative side of a power source 26. The positive side of power source 26 is connected to the common return and to one end of a second winding 52 on core 48. The other end of winding 52 is connected to one side of a second unidirectional element 53. The other side of the second unidirectional element 53 is connected between the filter circuit and the base of the transistor 47, and is polarized so as to conduct a suitable feed back polarity to maintain transistor 47 conductive until the termination of the clock pulse. An output winding 54 is provided on core 48 with one end thereof connected to the common return 44, a resistor 55 connected thereacross and an output terminal 15 provided at the end opposite the end connected to the common return.

In the operation of the circuit of this invention, the clock pulse, of predetermined phase and amplitude, is applied to the base of transistor 56, thereby rendering it conductive. Should a properly polarized input information trigger pulse be applied at 14, transistor 47 will be rendered conductive and current will flow from power source 26 through winding 49, transistors 47 and 56 to the common return 44. This flow of current induces a potential of the same polarity as the actuating input trigger on the base of transistor 47 to maintain transistor 47 in a conductive state after the termination of the input trigger until the completion of the clock pulse. Upon the completion of the clock pulse, no current flows from power source 26 and the transistors are then rendered non-conductive until the arrival of another clock pulse for one and another trigger pulse for the other. Current will not flow from power source 26 unless there is an occurrence of the trigger pulse during the clock pulse.

The waveforms shown in FIG. 2 are now readily understood as being representative of the operation of the single stage just described. The clock is shown in the first line with the trailing edge of the clock pulse being numbered 27. The input or trigger pulses are shown in the second line and are shown as being somewhat random in their time position and in their width. The four illustrated trigger pulses are numbered 28, 29, 31 and 32. The output pulses are illustrated with the leading edge 33 of the first pulse in coincidence with the leading edge of the clock and the trigger pulses. This coincidence is not a requirement for the operation of the circuit, but is merely illustrative of the operation should this occur. It is noted that the first output signal has a leading edge 33 in coincidence with the leading edges of the first clock and trigger pulses. The trailing edge 34 of the first output pulse is aligned with the trailing edge 27 of the first clock pulse, completely independent of the trailing edge of the first trigger pulse. For the other output pulses, leading edge 35 is aligned with leading edge 29 of the second trigger pulse, trailing edge 36 is aligned with the trailing edge 27 of the second clock pulse, leading edge 37 is aligned with leading edge 31 of the third trigger pulse, trailing edge 38 is aligned with the trailing edge 27 of the third clock pulse, leading edge 39 is aligned with leading edge 32 of the fourth trigger pulse, and trailing edge 41 is aligned with trailing edge 27 of the fourth clock pulse.

The inherent advantages of this type of circuitry are now apparent. The regenerative broadening circuit of this invention is a dynamic circuit with no power consumption when the circuit is not in use. Further, triggering can take place only during clock time. Also, timing is quantized by the back edge of the clock pulse; and, since this type of circuit saturates, amplitudes are quantized. A plurality of logic stages have been combined to be controlled by a single gate which is controlled by the clock signal, and random application of input pulses to each and all of the stages thus combined is unhampered.

Since many variations of the specific embodiment described above will occur to those skilled in the art, the invention is to be limited only as specified in the following claims.

In a typical embodiment, the transistors 47 and 56 are type 2N496 with the restriction that the beta voltage gain is greater than or equal to 2.5 and less than or equal to 6.25. Winding 49 has 1.18 millihenries plus or minus 10%. The numbers of turns on windings 52, 49 and 54 are 22:66:22. The diodes 42 and 53 are type 1N198. Resistor 43 is 10 kilohms, resistor 57 is 150 ohms, resistor 46 is 47 kilohms, resistor 55 is 820 ohms. Capacitor 45 is 150 micromicrofarads. The voltage source 26 is minus 7.5 volts.

Obviously, the polarities of all of the polarity sensitive elements can be reversed and positive clock pulses and trigger pulses can be used.

What is claimed is:

1. A transistor regenerative broadening circuit comprising a common return, a plurality of gated amplifier stages; each gated amplifier including an output transistor with a first emitter, a first collector and a first base, circuit means connecting said first base to said common return, an output transformer having a primary, a secondary and a tertiary winding, one end of said primary winding being connected to said first collector, a source of collector current connected between said common return and the other end of said primary winding, a load circuit connected across said secondary winding, a regenerative feedback path having an input end connected to one end of said tertiary winding and having an output end connected to said first base, the other end of said tertiary winding being connected to said common return, input circuit means coupled to said first base for applying information signal pulses to said output transistor; a source of standard gating pulses; said regenerative feedback of each gated amplifier being selected to sustain conduction in said gated amplifier for a period at least as great as the duration of the standard gating pulses, a gating transistor having a second base, a second collector and a second emitter; means connecting said source of standard gating pulses to said second base; said second emitter connected to said common return; said second collector being connected to said first emitter in each of the said plurality of stages.

2. The circuit according to claim 1 wherein said input means includes a first diode means to apply to said first base only the portions of the input pulse which have a given polarity and said feedback circuit includes a second diode means for isolating said tertiary winding from said given polarity.

3. A regenerative broadening circuit comprising a plurality of pulse lengthening circuits each having separate input and separate output terminals, a common switch means connected in series with all of said pulse lengthening circuits to simultaneously enable and simultaneously prevent current flow in all said pulse lengthening circuits, means for generating clock pulses connected to and controlling said switching means, said pulse lengthening circuits being adapted to lengthen any input pulse to the length of the clock pulse, whereby all output pulses are quantized to the back edge of said clock pulses.

4. A regenerative broadening circuit comprising a plurality of regenerative gated amplifier circuits each having separate input and separate output terminals, a common switch means connected in series with all of said gated amplifier circuits to simultaneously enable and simultaneously prevent gating of all of said gated amplifier circuits, means for generating clock pulses connected to and controlling said switching means, each of said regenerative gated amplifier circuits having sufficient positive feedback to sustain conduction in each of said gated amplifiers for at least the duration of the period of said clock pulses, whereby all output pulses are quantized to the back edge of said clock pulses.

References Cited in the file of this patent

UNITED STATES PATENTS

| | | |
|---|---|---|
| 2,539,623 | Heising | Jan. 30, 1951 |
| 2,676,251 | Scarbrough | Apr. 20, 1954 |
| 2,831,126 | Linvill et al. | Apr. 15, 1958 |